Patented Feb. 24, 1953

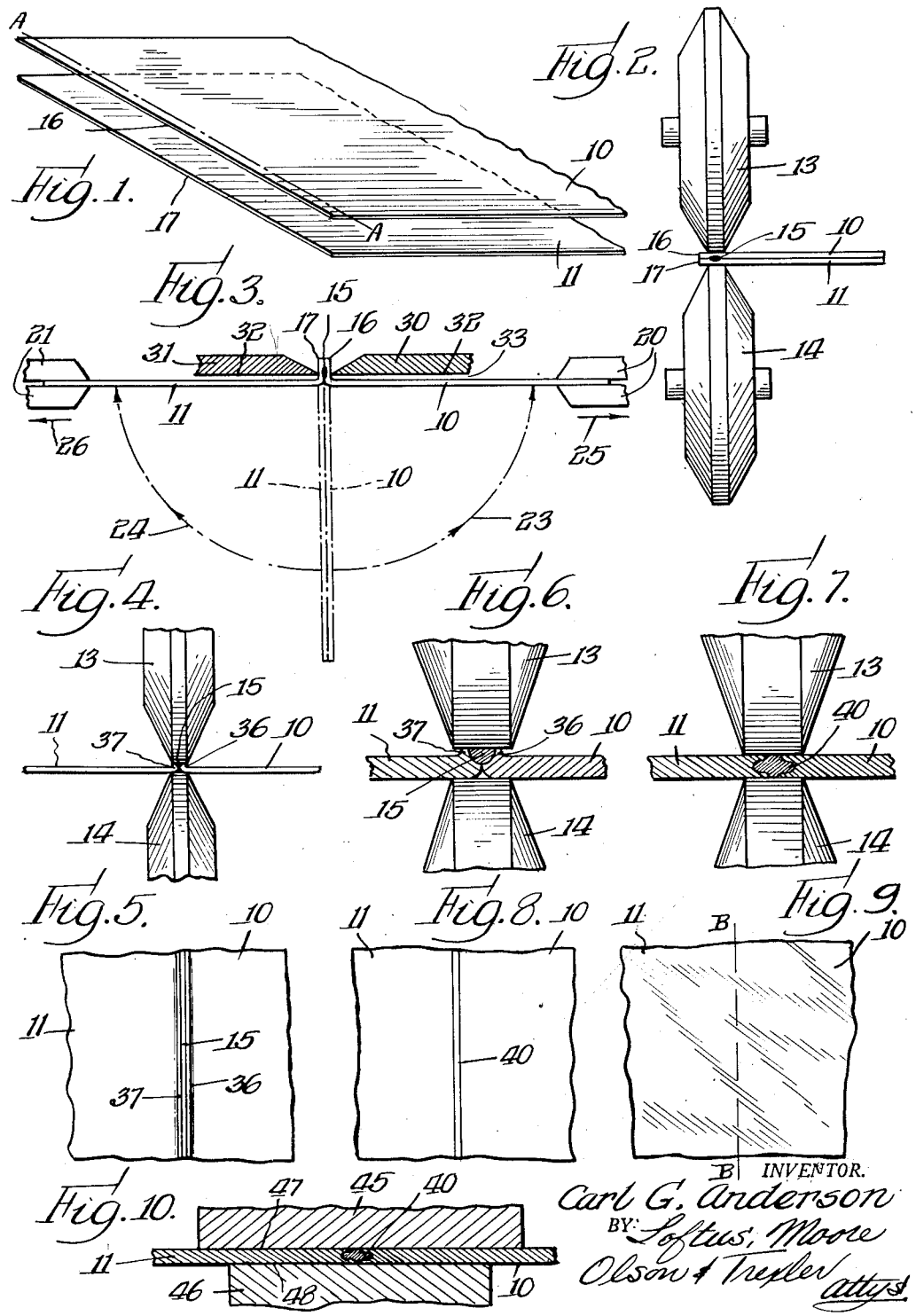

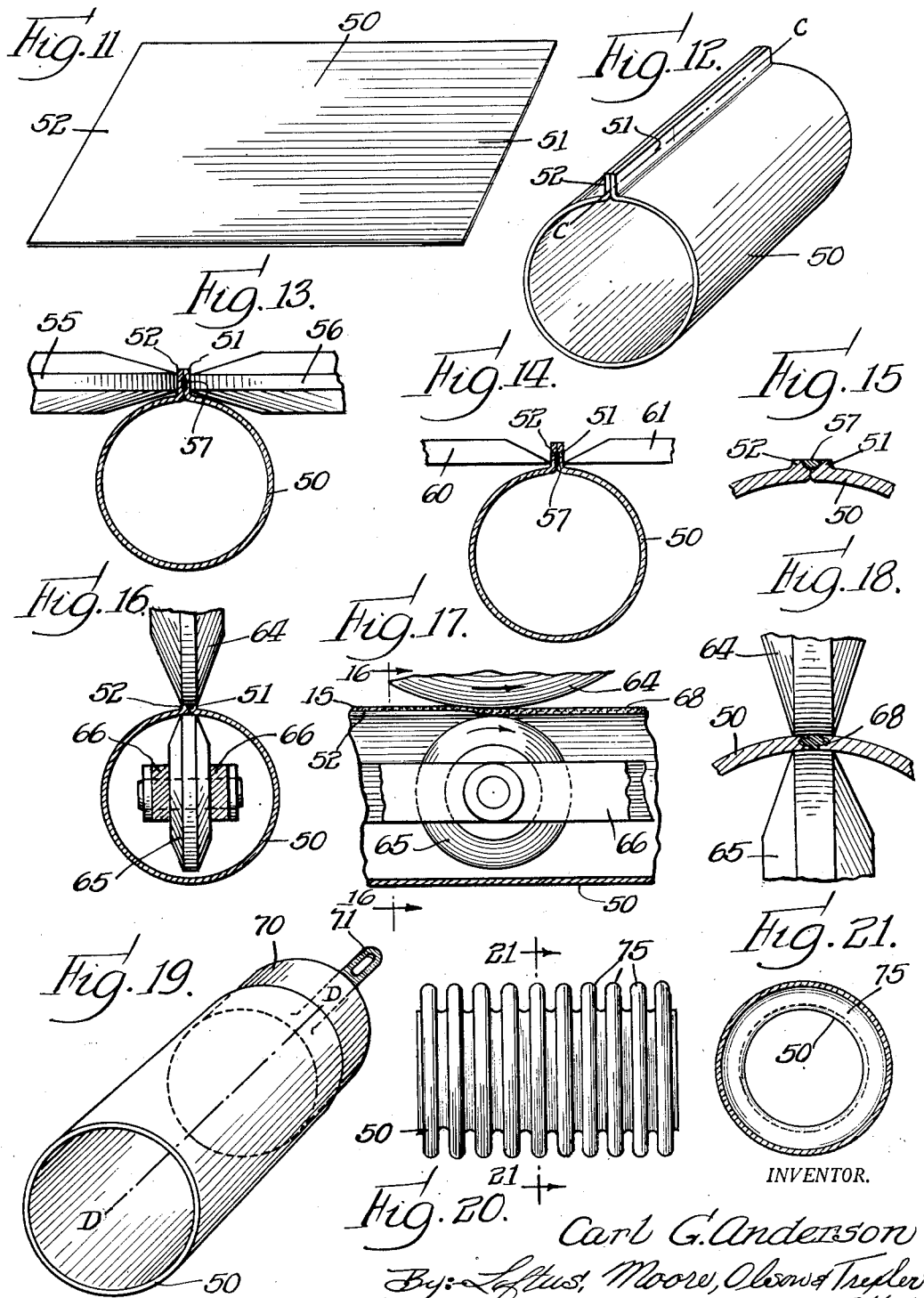

2,629,806

UNITED STATES PATENT OFFICE 2,629,806

WELDING METHOD AND ARTICLE PRODUCED THEREBY

Carl G. Anderson, Elgin, Ill., assignor to Chicago Metal Hose Corporation, Maywood, Ill., a corporation of Illinois Application October 23, 1944, Serial No. 559,918

9 Claims. (Cl. 219—10)

This invention relates to the art of welding, and concerns particularly the edge welding of ultra thin sheet metal.

It is an object of the invention to provide improved welding methods for effecting the edge welding and securing together of ultra thin metal sheets and sheet-like work pieces. More specifically stated, it is an object of the invention to provide improved welding methods for effecting the edge welding of ultra thin sheet metal work pieces wherein uniform stock thickness is preserved at the welded joint, while at the same time providing a weld which is uniform, reliable, and of satisfactory strength characteristics such that bending, spinning and other forming operations may be performed on it.

It is a further object of the invention to provide welding methods as set forth, employing the principles of electric resistance welding.

A still further object of the invention is to provide as a new and improved article of manufacture, ultra thin sheet metal work pieces edge joined by means of a welded joint, effectively resistant to stress or rupture, but which does not increase the normal stock thickness of the work pieces.

Various other objects, advantages and features of the invention will be apparent from the following specification when taken in connection with the accompanying drawings wherein certain preferred embodiments are set forth for purposes of illustration.

In the drawings, wherein like reference numerals refer to like parts throughout:

Figure 1 is a perspective view of a pair of sheet metal work pieces, such, for example, as may be edge welded and secured together in accordance with the principles of the invention;

Fig. 2 is an illustrative view, on an enlarged scale, showing the first step in effecting the edge welding of the work pieces of Fig. 1, in accordance with one preferred mode of operation;

Fig. 3 is an illustrative view, generally diagrammatic in form, showing further steps in effecting the securing of the work pieces;

Fig. 4 is an illustrative view showing the manner of effecting the final welding operations;

Fig. 5 is a plan view of the work pieces prior to the welding operation of Fig. 4;

Fig. 6 is a detailed sectional view illustrating the condition of the work pieces prior to the final welding operation of Fig. 4, drawn on a further enlarged scale;

Fig. 7 is a detailed illustrative view on the scale of Fig. 6, showing the work pieces after the final welding operations;

Fig. 8 is a plan view of the work pieces, on the scale of Fig. 5, and showing their condition after the final welding operations;

Fig. 9 is a view similar to Fig. 8, but showing the work pieces after polishing;

Fig. 10 is an illustrative view showing the work pieces, as finally welded, in cooperation with other work pieces or machine elements;

Fig. 11 is a perspective detail view of a sheet metal work piece to be formed into longitudinally seamed welded tubing, in accordance with the principles of the invention;

Fig. 12 is a perspective view of the first step in forming the tubing, from the work piece of Fig. 11;

Fig. 13 is a detail illustrative view showing the initial welding operation;

Fig. 14 illustrates a cutting operation, in the forming of the tubing, after the welding operation of Fig. 13;

Fig. 15 is a partial detail view of the tubing structure, on an enlarged scale, and after the cutting operations of Fig. 14;

Fig. 16 is an illustrative view, showing the final welding operations in forming the tube, on the line 16—16 of Fig. 17;

Fig. 17 is a longitudinal section of the structure of Fig. 16;

Fig. 18 is a detail illustrative view, on an enlarged scale, of the tubing structure after the final welding operations;

Fig. 19 is a perspective view showing the completed welded tubing, and illustrating the calibrating thereof, which may be effected as desired;

Fig. 20 is a side elevation of the tubing of Fig. 19 after corrugating operations have been performed thereon to provide a flexible tubing structure; and Fig. 21 is a transverse sectional view of the tubing structure of Fig. 20 on the line 21—21 thereof.

This invention relates to the edge welding of ultra thin sheet metal work pieces in such manner as to provide a weld having satisfactory tensile strength and satisfactory strength characteristics, such that bending, spinning, or other forming operations may be performed on it; while at the same time providing a welded joint which preserves the stock thickness of the parent metal. Conventionally, thin sheet metal work pieces, which are to be secured together along their edges, are lap welded. A lap weld, however, produces a metal thickness along the welded joint substantially double the thickness of the parent metal. In many instances this may be undesirable, rendering the work pieces unsatisfactory for their intended purpose. In accordance with the present invention, welding methods are provided applicable to the edge welding of thin metal work pieces of .002 inch thickness or less, while maintaining the thickness at the weld substantially that of the parent metal. Conventional butt welding operations ordinarily may be effected only upon work pieces having substantial thickness, for example, ordinarily not less than approximately .010 inch, and generally more, depending upon the size and character of the work.

Referring more specifically to the drawings, and first to the embodiment illustrated in Figs. 1–10, in Fig. 1 there is illustrated a pair of sheet metal work pieces 10 and 11, such, for example, as may be secured together along their edges in accordance with the principles of the invention. As indicated, these work pieces may be of ultra thin stock, for example, .002 inch or less in thickness, although it is to be understood that the work pieces may be materially thicker if desired, to and including the range of thicknesses ordinarily weldable by conventional butt welding operations. In other words, it is to be understood that while the invention has particular applicability to the welding of ultra thin sheet metal, because of the difficulty encountered in welding work pieces within this range without increase of the metal thickness at the welded joint, the invention is also and equally adapted for the welding of thicker work pieces, as may be desired. It is also to be understood that the work pieces may be of any size and shape in accordance with the requirements of the particular installation. In Fig. 1 and in the other figures of the drawings, assuming the work pieces to be of ultra thin stock it will be seen that their thickness has been magnified for illustrative purposes.

The work pieces, in the particular embodiment illustrated, may be of any metal which can be satisfactorily resistance welded, such, for example, as mild steel, stainless steel, Monel metal, Inconel steel, brass, etc.

In effecting the welding operations the work pieces are first superimposed and electric resistance welded between suitable electrodes, for example, electrode rollers 13 and 14, as shown in Fig. 2. As will be understood, this operation provides a resistance weld, as indicated at 15, between the work pieces extending longitudinally of the work piece edges which are to be secured together. In the particular embodiment shown, it will be seen that the work pieces have been so arranged in respect to the electrode rollers that the weld 15 will be disposed somewhat inwardly from the extreme plate edges indicated at 16 and 17, respectively. The work pieces may be drawn between the roller electrodes, during electrode rotation and while the welding current is applied, whereby to provide the resistance weld 15 of such length as may be desired, for example, as indicated by the line A—A in Fig. 1, in respect to the sheet 10.

After the weld 15 has been produced, as shown in Fig. 2, the work pieces are next operated upon, as indicated in Fig. 3, in effecting the further method steps of the invention. More specifically, the work pieces are gripped respectively between pairs of gripping jaws 20 and 21, and drawn from their dotted line position to their full line position as shown in Fig. 3. The gripping jaws 20 and 21 are indicated diagrammatically, and may be of any suitable character so as to grip the metal sheets and bend them into position as shown. As the gripping jaws move through the arcs respectively indicated at 23 and 24, they are simultaneously pulled in the direction indicated by the arrows 25 and 26, whereby to shape the work pieces into the position shown, with their main body portions substantially coplanar, and the work piece edges 16 and 17 extending upwardly at substantially right angles.

After the work pieces have been bent or shaped, as shown, a pair of shears or cutters, diagrammatically indicated at 30 and 31, are operated to shear off the plate edges at substantially the midpoint of the weld 15. In practice, the face edges 32 of the cutters may be spaced, for example, approximately 1/64 of an inch above the face surfaces of the work pieces, as indicated on an exaggerated scale in Fig. 3 at 33. The cutter blades 30 and 31 may be of any desired construction and operated in any desired manner.

As will be understood, by disposing the welding rollers 13 and 14 at the extreme edges 16 and 17 of the work pieces, in certain instances the weld 15 may be formed at or in such close proximity to the extreme sheet edges as to eliminate the necessity for the cutting operation, as by means of the cutters 30 and 31. However, in most instances it is preferred to effect the initial welding operation as shown in Fig. 2, and thereafter, by means of the cutters, sever the weld through its body portion. By this means, new plate edges are provided, as best indicated at 36 and 37 in Fig. 6, with the weld body 15 extending in a controlled and positive manner to and including the extreme plate edges.

After the work pieces have been formed and trimmed, as illustrated in Fig. 3, they are next subjected to a second welding operation, as indicated in Figs. 4–8. The work pieces are shown prior to welding in Figs. 4, 5 and 6, and after welding in Figs. 7 and 8. In effecting this welding operation the work pieces 10 and 11, with their upturned edges 36 and 37, and the interposed weld 15, are again passed between a pair of electrode rollers, such, for example, as the rollers 13 and 14. During this second welding operation, the weld between the plate edges is enlarged, as indicated in Fig. 7, the previous weld 15 being enlarged or supplemented to provide a complete weld between the plate edges, as indicated at 40. During this welding operation, not only are the plate edges completely welded as indicated, but the welding heat and pressure of the electrodes also effects a working or compression of the welded joint, as will be seen by a comparison of Figs. 6 and 7, whereby the work pieces are flattened along the length of the weld so that the resulting welded joint will have a thickness substantially that of the parent metal of the work pieces. In this connection it will be noted that the work pieces are so arranged in the vicinity of the welded joint when in the condition illustrated in Fig. 6, that they may be readily flattened to the condition of Fig. 7 by the welding heat and the clamping pressure of the roller electrodes. Any suitable means may be employed for adjustably controlling the clamping pressure of the roller electrodes, and the welding heat, whereby to flatten the welded joint into the condition indicated in Fig. 7. During the welding operation, wherein the weld 40 is produced, the initial weld 15 positively holds the work pieces in position and facilitates the formation of the completed weld.

It will be seen that the invention provides a modified or upset butt welding method which may be utilized for effecting the edge welding of ultra thin sheet metal work pieces so as to provide a welded joint having a thickness substantially that of the stock of the parent sheet metal, as distinguished from a lap weld, which produces a joint having a thickness substantially double that of the parent sheet metal. While the invention may be utilized in effecting the welding of relatively thicker work pieces, .010 inch and more, such as might be butt welded by ordinary methods, it is also adaptable to the welding of ultra thin sheet metal having a thickness of .002 inch or less, as to which lap welding methods are ordinarily required. A uniform and reliable weld may be produced which on test has been found to have satisfactory tensile strength, and satisfactory strength characteristics, equal to the characteristics of the parent metal. In accordance with the methods disclosed, the thickness of the welded joint may be controlled and rendered substantially equal to the thickness of the parent metal, so that upon suitable polishing or grinding operations the welded joint may be rendered undetectable to the eye or ordinary methods of detection. Such condition is indicated in Fig. 9 wherein the work pieces are indicated after polishing. The undetectable welded joint is indicated by the line B—B.

In Fig. 10 the work pieces, after welding, are illustrated between a pair of clamping blocks 45 and 46 having cooperative parallel work faces 47 and 48. As will be seen, the welded joint 40 being of the same thickness as that of the parent metal of the work pieces, permits a full and uniform area of contact between the work pieces 10 and 11 and the clamping blocks, such as would be impossible in the case of a lap welded joint. Fig. 10 thus indicates merely one of a number of instances wherein the utility of the invention may be employed.

As previously indicated, the work piece or pieces may be of various desired shapes and sizes, in accordance with the requirements of the particular installation. In Figs. 11-21, the principles of the invention are shown as applied to the welding of longitudinally seamed tubing. As shown in Figs. 11 and 12, a sheet metal work piece 50, of suitable size and thickness in accordance with the requirements of the completed tubing, is first formed from flat form, as indicated in Fig. 11, into tubular form, as indicated in Fig. 12, the longitudinal plate edges or margins 51 and 52 being bent upwardly at right angles and into engagement as shown. In this instance the opposite marginal portions of the sheet metal plate member 50 constitute the pair of work pieces to be welded.

As will be understood, instead of bending the plate edges angularly, as shown, the tubing may for example be formed into generally oval shape and the plate edges superposed and initially secured and then bent substantially as in Figs. 2 and 3, as previously described.

After the shaping of the work piece into the form of Fig. 12, it is then welded, as shown in Fig. 13, between suitable welding electrodes, such, for example, as electrode rollers 55 and 56 similar to the electrode rollers 13 and 14 in the embodiment previously described. During this operation a resistance weld 57 is formed between the tube flanges 51 and 52, extending longitudinally of the tube along the line generally indicated at C—C in Fig. 12.

Following the welding operation, the flanges 51 and 52 are trimmed by means of cutters 60 and 61, as diagrammatically indicated in Fig. 14, in the manner and for the purpose previously described in reference to Fig. 3 in connection with the embodiment previously set forth. The tube structure, after the trimming of the flanges, is shown on an enlarged scale in Fig. 15, wherein it will be seen that the flanges 51 and 52 are preferably trimmed through the body portion of the weld 57.

After trimming, the work pieces are next subjected to a second welding operation, as indicated in Figs. 16, 17 and 18. In effecting this welding operation, a pair of welding rollers 64 and 65, one disposed exteriorly of the tubing and the other disposed interiorly thereof, cooperatively grip the tubing along the line of the welded joint and effect a further longitudinal seam weld. As best shown in Fig. 17, the welding electrode roller 65 is sufficiently small so that it may be disposed within the tubing, and rotatably supported therein by means of a pair of support arms 66, or other suitable support means, disposed within and extending longitudinally of the tubing. During the welding operation, welding heat and clamping pressure are applied between the roller electrodes, sufficient to compress the flanges 51 and 52, and enlarge the weld 57 into a complete weld 68, between the plate edges, as shown on a magnified scale in Fig. 18. It will be seen that after this second welding operation, not only is a complete weld formed between the sheet metal plate or work piece edges to be secured, but the work pieces in the vicinity of the weld have a thickness substantially that of the parent stock of the sheet metal plate or work piece 50.

It is to be understood that any suitable apparatus may be employed for performing the welding operations of Figs. 16 and 17. Thus instead of the internal electrode roller, an internal arbor may be employed, for example as in the patent to Dreyer No. 2,262,423, dated November 11, 1941.

The completed welded tubing is indicated in perspective in Fig. 19. As in the case of the embodiment previously described, the longitudinal seam weld which is provided along the length of the tubing, along the line indicated at D—D, may, after polishing, be rendered substantially undetectable. As diagrammatically shown in Fig. 19, a calibrating plug 70 may be drawn through the tubing so as to calibrate the tubing for size and to insure the round or circular form thereof. The calibrating plug may or may not be used, depending upon the requirements of the particular installation. The plug is cylindrical in form, and of accurate calibrating size. It may be drawn through the tubing by means of an axially extending eye portion 71.

In Figs. 20 and 21 the tubing member 50 is illustrated after a series of annular corrugations 75 have been imparted thereto so as to form the tubing into a flexible tubing structure. Due to the fact that the tubing is of uniform wall thickness along the length of its entire periphery, as the corrugations are formed, the tubing exhibits no tendency to depart from its round or circular contour. In other words, due to the uniform wall thickness, the tubing piece does not tend to oval during the corrugating operations, thus simplifying the corrugating, and avoiding the necessity for reshaping of the tubing after the corrugations have been formed. Not only does the weld permit the forming of the tubing without rupture, but due to the uniform wall thickness, equal bending or forming reactions will be provided uniformly along the periphery of the tubing structure.

It is obvious that various changes may be made in the specific structural embodiments and method steps set forth without departing from the spirit of the invention. The invention is, accordingly, not to be limited to the specific embodiments set forth, but only as indicated in the following claims.

The invention is hereby claimed as follows:

1. The method of welding which comprises providing a pair of sheet metal work pieces having a thickness less than .01 inch, and edge welding said work pieces along a predetermined margin thereof by means of a plurality of sequential continuous seam welding operations forming a weld having a thickness substantially no greater than the thickness of the parent stock.

2. The method of edge welding sheet-like work pieces which comprises performing a plurality of continuous seam welding operations along predetermined margins of the work pieces to be secured, said welding operations being performed with the work pieces in different positions in respect to the welding tools, and imparting to the welded margins by said welding operations a thickness substantially no greater than the thickness of the parent work piece stock.

3. The method of electric resistance edge welding sheet-like work pieces which comprises performing a plurality of welding operations along predetermined margins of the work pieces to be secured by engaging the work piece margins between a pair of welding electrodes, said welding operations being performed with the work pieces in different positions relative to the position of the welding electrodes and with the joint to be welded clamped directly therebetween, at least one of said welding operations being performed with the work piece edges in superposed relation with the welding electrodes clampingly engaging the lateral surfaces thereof, and imparting to the welded margins by the final welding operation a thickness substantially no greater than the thickness of the parent work piece stock.

4. The method of electric resistance edge welding sheet-like work pieces which comprises performing a plurality of welding operations along predetermined margins of the work pieces to be secured by engaging the work piece margins between a pair of welding electrodes, said welding operations being performed with the work pieces in different positions relative to the position of the welding electrodes and with the joint to be welded clamped directly therebetween, at least one of said welding operations being performed with the work piece edges in superposed relation with one welding electrode clampingly engaging the end surfaces thereof, and imparting to the welded margins by the final welding operation a thickness substantially no greater than the thickness of the parent work piece stock.

5. The method of edge welding sheet-like work pieces which comprises bending the work piece margins to be secured angularly in respect to the work piece body portions, disposing said margins in superimposed relation, engaging an electrode progressively along said margins to perform an initial continuous seam welding operation longitudinally of said margins to form a weld therebetween, and thereafter engaging an electrode progressively along said margins in a different position in respect thereto to perform a second continuous seam welding operation longitudinally of said margins while applying sufficient heat and pressure to the end edges of said margins so as to reduce the thickness of the welded joint.

6. The method of edge welding sheet-like work pieces which comprises bending the work piece margins to be secured angularly in respect to the work piece body portions, disposing said margins in superimposed relation, performing an initial welding operation longitudinally of said margins to form a weld therebetween, trimming said margins by severing the ends thereof through the body portion of said weld, and thereafter performing a second welding operation longitudinally of said margins while applying sufficient heat and pressure to the end edges of said margins so as to reduce the thickness of the welded joint.

7. The method of forming metal tubing which comprises shaping a sheet metal work piece into tubular form, bending the juxtaposed marginal portions of said work piece radially with respect to the tubing body, superimposing said marginal portions, performing an initial continuous seam welding operation along the length thereof, whereby to form a weld between said marginal portions, and thereafter performing a second continuous seam welding operation along the length of said marginal portions by electrodes disposed internally and externally of the tubing body while applying heat and pressure to the end edges thereof so as to reduce the thickness of the welded margin.

8. The method of forming flexible metal tubing which comprises shaping a sheet metal work piece into tubular form, bending the juxtaposed marginal portions of said work piece radially with respect to the tubing body, superimposing said marginal portions, performing an initial welding operation along the length thereof by electrodes clamped against the opposite faces of said marginal portions, whereby to form a weld between said marginal portions, and thereafter performing a second welding operation along the length of said marginal portions by electrodes clamped together internally and externally thereof while applying heat and pressure to the end edges thereof by said electrodes so as to reduce the thickness of the welded margin, and corrugating the thus welded tubing to provide a flexible tubing structure.

9. The method of electric resistance edge welding sheet-like work pieces which comprises superimposing predetermined margins of the work pieces to be secured, clampingly engaging the face surfaces of said margins between a pair of welding electrodes and performing a first welding operation therealong, and thereafter clampingly engaging the end surfaces of said margins between a pair of welding electrodes whereby to perform a second welding operation along said margins to provide a finished weld, sufficient welding heat and pressure being applied to the work pieces by the welding electrodes during the second welding operation to reduce the welded work piece margins to a thickness substantially no greater than the thickness of the parent work piece stock.

CARL G. ANDERSON.

(References on following page)

REFERENCES CITED

The following references are of record in the file of this patent:

UNITED STATES PATENTS

| Number | Name | Date |
|---|---|---|
| 73,929 | Recht | Jan. 28, 1868 |
| 86,925 | Johnson | Feb. 16, 1869 |
| 870,847 | Rietzel | Nov. 12, 1907 |
| 1,000,967 | Farquhar | Aug. 15, 1911 |
| 1,083,956 | Thompson | Jan. 13, 1914 |
| 1,108,191 | Lachman | Aug. 25, 1914 |
| 1,230,114 | Cary | June 19, 1917 |
| 1,308,781 | Gravell | July 8, 1919 |
| 1,407,001 | Schroder | Feb. 21, 1922 |
| 1,441,484 | Conover | Jan. 9, 1923 |
| 1,511,849 | Taylor | Oct. 14, 1924 |
| 1,544,201 | Waters | June 30, 1925 |
| 1,648,046 | Fulton | Nov. 8, 1927 |
| 1,765,363 | Frahm et al. | June 24, 1930 |
| 1,767,220 | Malm | June 24, 1930 |
| 1,829,638 | Egler | Oct. 27, 1931 |
| 1,934,064 | Hermanson et al. | Nov. 7, 1933 |
| 2,039,781 | Debendetti | May 5, 1936 |
| 2,115,419 | Dreyer | Apr. 26, 1938 |
| 2,233,233 | Williams | Feb. 25, 1941 |
| 2,258,911 | Skoko | Oct. 14, 1941 |
| 2,322,796 | Fentress | June 29, 1943 |
| 2,329,938 | Ortiz | Sept. 21, 1943 |
| 2,402,381 | Diller | June 18, 1946 |